(12) United States Patent
Hotta et al.

(10) Patent No.: US 8,305,868 B2
(45) Date of Patent: Nov. 6, 2012

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 966 days.

(21) Appl. No.: 12/137,312

(22) Filed: Jun. 11, 2008

(65) Prior Publication Data

US 2008/0310286 A1 Dec. 18, 2008

(30) Foreign Application Priority Data

Jun. 15, 2007 (JP) ................................. 2007-158612
Jan. 25, 2008 (JP) ................................. 2008-014589

(51) Int. Cl.
*G11B 7/13* (2012.01)
(52) U.S. Cl. .................................. 369/120; 369/112.05
(58) Field of Classification Search ........................ None
See application file for complete search history.

(56) References Cited

U.S. PATENT DOCUMENTS

| | | | | |
|---|---|---|---|---|
| 5,757,758 A | * | 5/1998 | Yagi et al. ................ | 369/112.25 |
| 2001/0017830 A1 | * | 8/2001 | Arai et al. .................... | 369/53.2 |
| 2002/0159342 A1 | * | 10/2002 | Ogasawara et al. ......... | 369/44.23 |
| 2003/0058776 A1 | * | 3/2003 | Sakamoto ................ | 369/112.07 |

FOREIGN PATENT DOCUMENTS

| | | |
|---|---|---|
| JP | 11-23960 | 1/1999 |
| JP | 2000-81566 | 3/2000 |
| JP | 2006-172605 | 6/2006 |

* cited by examiner

*Primary Examiner* — Wayne Young
*Assistant Examiner* — Brian Butcher
(74) *Attorney, Agent, or Firm* — Fish & Richardson P.C.

(57) ABSTRACT

An optical pickup apparatus comprising: an objective lens formed so that a first and second laser beams different in wavelength are respectively focused onto signal recording layers of a first and second optical discs; and a photodetector including a square-shaped light-receiving portion for being irradiated with return light, as a spot, of the first or second laser beam respectively reflected from the signal recording layers of the first or second optical discs, to generate a focus error signal, a length of a diagonal line of the light-receiving portion being substantially equal to a longer diameter of an elliptical spot formed in a direction of the diagonal line when the focus error signal is at a maximum level for an optical disc that is either one of the first and second optical discs, to which a laser beam shorter in wavelength out of the first and second laser beams is focused.

3 Claims, 4 Drawing Sheets

OPTICAL PICKUP APPARATUS

CROSS-REFERENCE TO RELATED APPLICATION

This application claims the benefit of priority to Japanese Patent Application Nos. 2007-158612 and 2008-014589, filed Jun. 15, 2007 and Jan. 25, 2008, respectively, of which full contents are incorporated herein by reference.

BACKGROUND OF THE INVENTION

1. Field of the Invention

The present invention relates to an optical pickup apparatus performing an operation of reading out a signal recorded in an optical disc or of recording a signal in an optical disc.

2. Description of the Related Art

There is widely used an optical disc apparatus capable of performing an operation of reading out a signal or recording a signal by irradiating a signal recording layer of an optical disc with a laser beam emitted from an optical pickup apparatus.

There is generally used an optical disc apparatus using an optical disc such as CD and DVD, while there has been recently developed an optical disc apparatus using an optical disc with improved recording density, i.e., an optical disc (new-generation optical disc) of the Blu-ray standard or the HD-DVD (High Density Digital Versatile Disc) standard.

For a laser beam for the operation of reading out a signal recorded in the optical disc of the CD standard, an infrared light with a wavelength of 780 nm is used. For a laser beam for the operation of reading out a signal recorded on the optical disc of the DVD standard, a red light with a wavelength of 650 nm is used.

There is provided a protective layer with a thickness of 1.2 mm on a top face of the signal recording layer of the optical disc of the CD standard, and a numerical aperture of an objective lens for use in performing the operation of reading out a signal from the signal recording layer is specified at 0.45. There is provided a protective layer with a thickness of 0.6 mm on a top face of a signal recording layer of the optical disc of the DVD standard, and a numerical aperture of an objective lens for use in performing the operation of reading out a signal from the signal recording layer is specified at 0.6.

In contrast to the above-described optical discs of the CD standard and the DVD standard, for a laser beam for the operation of reading out a signal recorded on the optical disc of the Blu-ray standard or the HD-DVD standard, a laser beam with a shorter wavelength, a blue-violet light with a wavelength of 405 nm is used, for example.

There is provided a protective layer with a thickness of 0.1 mm on a top face of a signal recording layer of the optical disc of the Blu-ray standard, and a numerical aperture of an objective lens for use in performing the operation of reading out a signal from the signal recording layer is specified at 0.85.

On the other hand, there is provided a protective layer with a thickness of 0.6 mm on a top face of a signal recording layer of the optical disc of the HD-DVD standard, and a numerical aperture of an objective lens for use in performing the operation of reading out a signal from the signal recording layer is specified at 0.65.

As described above, for the laser beam for performing the operation of reading out signals recorded on the optical discs of the Blu-ray standard and the HD-DVD standard, the blue-violet light with a wavelength of 405 nm can be used. Thus, by using a laser diode in common for the both optical discs, it may become possible to produce an optical pickup apparatus capable of performing the operation of reading out signals from the optical discs of these two standards.

In order to read out signals from the both optical discs, however, the numerical aperture needs to be changed corresponding to each of the optical discs since the location of the signal recording layer and the numerical aperture required of the objective lens are different between the two optical discs. There has been developed an optical pickup apparatus capable of performing the above-described operation (see Japanese Patent Application Laid-Open Publication No. 2006-172605).

Recently, there is commercialization of an optical disc apparatus capable of using not only optical discs of the above described CD standard and DVD standard but also optical discs of the Blu-ray standard or the HD-DVD standard, which are new-generation optical discs. Consequently, an optical pickup apparatus used for such an optical disc apparatus naturally results in being configured so as to be able to perform the operation of reading put the signals from the signal recording layer provided in the optical disc of a compatible standard or the operation of recording the signals onto the signal recording layer provided therein.

In such an optical pickup apparatus, it is difficult to apply the laser beam having the above-described wavelength onto the signal recording layer of the optical disc by a single objective lens, thereby using two objective lenses: one objective lens for applying the laser beam to the optical discs of the CD standard and the DVD standard, for example; and the other objective lens for applying the laser beam to the optical disc of the Blu-ray standard, for example (see Japanese Patent Application Laid-Open Publication Hei 11-23960).

In the optical disc apparatus capable of using a new-generation optical disc, the optical discs of the CD standard and the DVD standard, which are conventional optical discs, can also be used. The optical pickup apparatus included in such an optical disc apparatus is generally provided with two objective lenses as described above.

Such an optical pickup apparatus is configured such that either one of the objective lenses focuses laser beams different in wavelength onto the signal recording layers of the optical discs of the CD standard and the DVD standard. In order to focus the laser beams different in wavelength onto such optical discs different in standard, there is developed a technology using an objective lens with an incidence plane on which an annular diffraction grating is formed (see Japanese Patent Application Laid-Open Publication 2000-81566).

In the optical pickup apparatus, there is performed a focus control operation for precisely focusing a spot obtained by focusing the laser beam with the objective lens onto the signal recording layer of the optical disc or a tracking control operation for causing the spot to follow a signal track by utilizing three beams, i.e., a main beam that is zeroth-order diffracted light and sub beams that are ±first-order diffracted lights, which are split and generated by the diffraction grating, as is common knowledge.

In order to accommodate the optical disc of each of the standards, when the objective lens with a diffraction grating is used to diffract the laser beam of each of the wavelengths so that the laser beam is focused onto the signal recording layer, a diffraction groove of the diffraction grating is designed so as to improve a diffraction efficiency of the diffracted light obtained from the laser beam of each of the wavelengths. In designing such a diffraction grating, it is difficult to secure the optimum diffraction efficiency for the laser beams of all the wavelengths, and therefore, the diffraction grating is designed with sacrificing diffraction efficiency for a diffraction grating of a laser beam of a wavelength low in priority.

For example, since the maximum light output is lower in the laser beam with shorter wavelength in the present state, the priority of the diffraction efficiency needs to be given to an optical disc having a higher recording density, and thereby sacrificing a diffraction efficiency for a laser beam for CD of which the generation is the oldest and the recording density is the lowest. In this case, although it depends on the diffraction efficiencies set for the laser beams for other optical discs, in some designs, the diffraction efficiency in the laser beam for CD becomes about 40%, which is a value lower than that of an unnecessary diffracted light (about 60%) called a flare light.

With the diffraction efficiency like this, there increases an amount of flare light occurring from the main beam whose light intensity is the highest among the above-described three beams, which is received by a light receiving region for a sub beam provided in a photodetector, to an unignorable degree, which leads to a problem that the tracking servo operation or the focus servo operation becomes unstable.

The diffraction grating formed on the objective lens is designed such that the numerical aperture is appropriate for each of the optical discs according to the wavelength of the laser beam for CD and that of the laser beam for DVD. The optical pickup apparatus has characteristics that when the numerical aperture of the objective lens is reduced, degradation of characteristics based on an inclination of the objective lens relative to a signal surface of the optical disc is reduced.

In an optical pickup apparatus configured such that an operation of focusing the laser beam onto the signal recording layer provided in the optical disc of the CD standard and an operation of focusing the laser beam onto the signal recording layer provided in the optical disc of the DVD standard are performed with the objective lens formed with the annular diffraction grating, the inclination of the objective lens or the like is set with giving higher priority to characteristics of the optical disc of the DVD standard, and therefore, characteristics for the optical disc of the CD standard is degraded.

In order to improve these points, there may be considered a method of reducing the numerical aperture of the objective lens which is set correspond to the optical disc of the CD standard with taking the above-described characteristics into consideration. When the numerical aperture is reduced, however, there increases the amount of flare light received by the light receiving region provided in the photodetector to an unignorable degree. As a result, it becomes difficult to obtain an exact focus error signal, which leads to a problem that the focus servo operation performed with the use of the focus error signal becomes unstable.

SUMMARY OF THE INVENTION

An optical pickup apparatus according to an aspect of the present invention, comprises: an objective lens formed with an annular diffraction grating according to a numerical aperture so that a first laser beam having a first wavelength and a second laser beam having a second wavelength are focused onto a signal recording layer of a first optical disc and a signal recording layer of a second optical disc respectively, the first and second optical discs respectively including cover layers different in thickness covering the signal recording layers; and a photodetector including a square-shaped light receiving portion for being irradiated with return light as a spot to generate a focus error signal, the light receiving portion including a four-divided light receiving portion having four sensor portions each in a square shape, the return light being return light of the first laser beam reflected from the signal recording layer of the first optical disc or return light of the second laser beam reflected from the signal recording layer of the second optical disc, a length of a diagonal line of the light receiving portion being substantially equal to a longer diameter of an elliptical spot formed in a direction of the diagonal line when the focus error signal for an optical disc is at a maximum level, the optical disc being either one, of the first and second optical discs, to which a laser beam shorter in wavelength out of the first and second laser beams is focused.

Other features of the present invention, will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

It is assumed that an embodiment according to the present invention is applied to an optical pickup apparatus compatible with an optical disc of a CD standard and that of a DVD standard.

Figure 1:
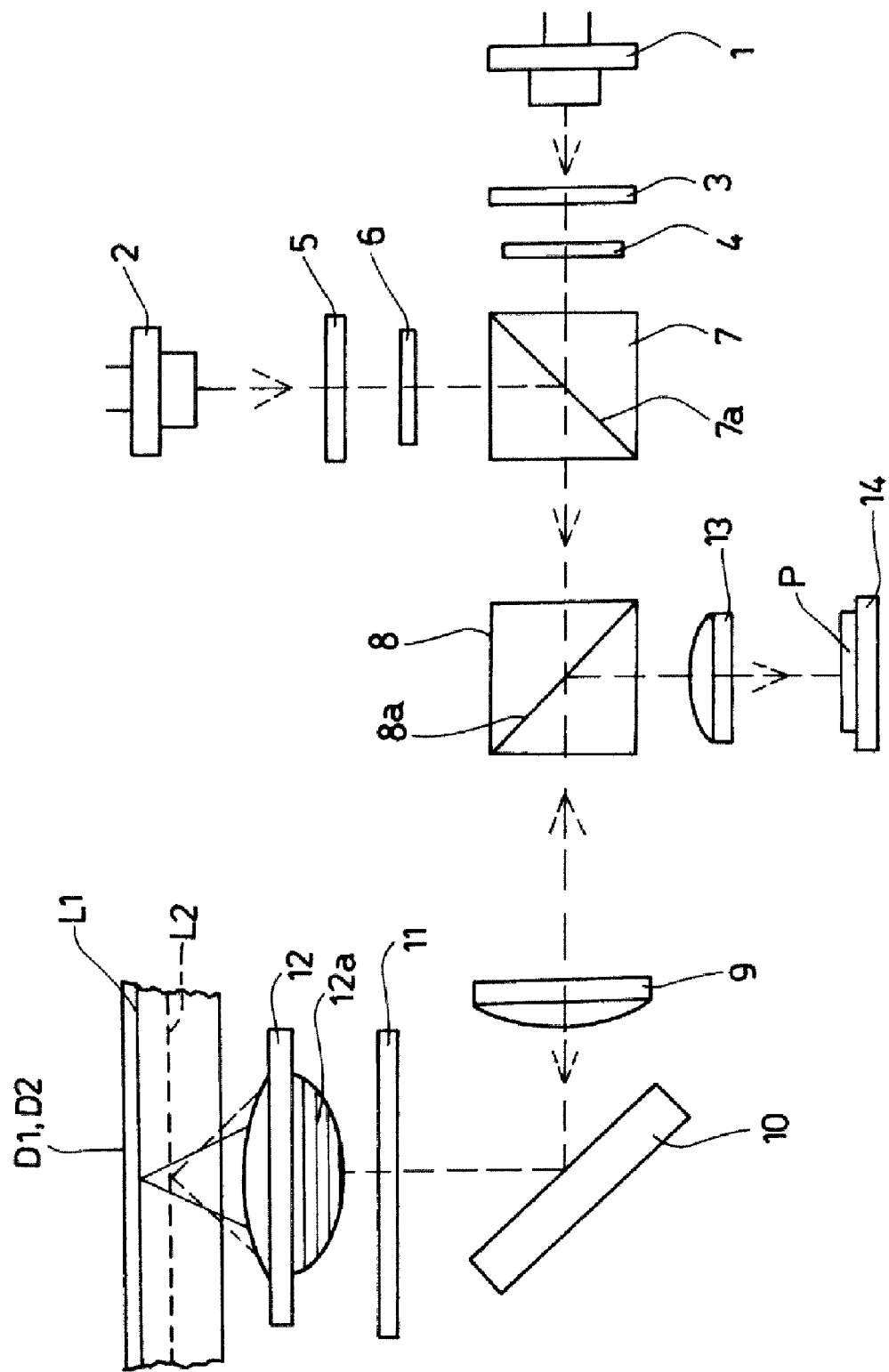
FIG. 1 is an optical arrangement diagram showing an optical pickup apparatus according to one embodiment of the present invention.

In FIG. 1, reference numeral 1 denotes a first laser diode for emitting a laser beam to be focused to an optical disc of a CD standard, i.e., a first optical disc D1, provided with a signal recording layer L1 at a position represented by a solid line in FIG. 1. The first laser diode is configured to generate a first laser beam with a first wavelength in a range of 765 nm to 805 nm in an infrared wavelength region, e.g., 780 nm. Reference numeral 2 denotes a second laser diode for emitting a laser beam to be focused to an optical disc of a DVD standard, i.e., a second optical disc D2, provided with a signal recording layer L2 at a position represented by a dotted line in FIG. 1. The second laser diode is configured to generate a second laser beam with a second wavelength in a range of 645 nm to 675 nm in a red-color wavelength region, e.g., 650 nm.

Reference numeral 3 denotes a diffraction grating for the first laser beam which is disposed at a position where the first laser beam emitted from the first laser diode 1 impinges. The diffraction grating for the first laser beam 3 splits the first laser beam to generate a main beam of zeroth-order diffracted light and sub beams of ±first-order diffracted lights. Reference numeral 4 denotes a half-wave plate for the first laser beam which the first laser beam having passed through the diffraction grating for the first laser beam 3 enters. The half-wave plate for the first laser beam 4 adjusts a polarization direction.

Reference numeral 5 denotes a diffraction grating for the second laser beam, which is disposed at a position where the second laser beam emitted from the second laser diode 2 impinges. The diffraction grating for the second laser beam 5 splits the second laser beam to generate a main beam of zeroth-order diffracted light and sub beams of ±first-order diffracted lights. Reference numeral 6 denotes a half-wave plate for the second laser beam which the second laser beam having passed through the diffraction grating for the second laser beam 5 enters. The half-wave plate for the second laser beam 6 adjusts a polarization direction.

Reference numeral 7 denotes a dichroic prism which the first laser beam having passed through the half-wave plate for the first laser beam 4 and the second laser beam having passed through the half-wave plate for the second laser beam 6 enter from different directions. The dichroic prism 7 is provided with a filter surface 7a which allows the first laser beam to pass therethrough and reflects the second laser beam.

The dichroic prism 7 plays a role of arranging the first laser diode 1 and the second laser diode 2 in different optical paths. The filter surface 7a of the dichroic prism 7 is covered with a reflection-and-transmission coating having such a wavelength selectivity as to secure 95% or more of transmittance of the laser beam with a wave length of 780 nm that is the first wavelength, and secure 5% or less of transmittance, i.e., 95% or more of reflectance of the laser beam with a wave length of 650 nm that is the second wavelength.

Reference numeral 8 denotes a polarization beam splitter which the first laser beam having passed through the filter surface 7a of the dichroic prism 7 and the second laser beam having been reflected by the filter surface 7a thereof enter. The polarization beam splitter 8 is provided with a polarization filter surface 8a which allows a p-polarized light to pass therethrough and reflects an s-polarized light. A configuration is made such that the half-wave plate for the first laser beam 4 converts the first laser beam emitted from the first laser diode 1 into the p-polarized light, and the half-wave plate for the second laser beam 6 converts the second laser beam emitted from the second laser diode 2 into the p-polarized light. Therefore, the first laser beam and the second laser beam entering the polarization beam splitter 8 are to pass through the polarization filter surface 8a.

Reference numeral 9 denotes a collimator lens disposed at a position where the first laser beam and the second laser beam having passed through the polarization beam splitter 8 enter. The collimator lens 9 converts the incident laser beams into a parallel light. Reference numeral 10 denotes a reflection mirror on which the first laser beam and the second laser beam converted by the collimator lens 9 into the parallel light impinge. The reflection mirror 10 changes a direction of an optical axis to a right angle direction.

Reference numeral 11 denotes a quarter-wave plate disposed at a position where the first laser beam and the second laser beam reflected by the reflection mirror 10 enter. The quarter-wave plate 11 polarizes the laser beam from a linear polarized light into a circular polarized light, and vice versa. Reference numeral 12 denotes an objective lens disposed at a position where the first laser beam and the second laser beam having passed through the quarter-wave plate 11 is applied to the objective lens. The objective lens 12 performs an operation of focusing the first laser beam onto the signal recording layer L1 of the first optical disc D1 and focusing the second laser beam onto the signal recording layer L2 of the second optical disc D2.

In the objective lens 12, there is formed on an incident surface side thereof an annular-shaped diffraction grating 12a about an optical axis, which performs an operation of diffracting: the first laser beam of first wavelength used for the operation of reading out the signal recorded on the signal recording layer L1 of the first optical disc D1; and the second laser beam of second wavelength used for the operation of reading out the signal recorded on the signal recording layer L2 of the second optical disc D2, in a manner corresponding to each of the optical characteristics of the laser beams. The first laser beam and the second laser beam which enter the objective lens 12 through the quarter-wave plate 11 are diffracted by the diffraction grating 12a to be focused on the signal recording layer L1 of the first optical disc D1 and on the signal recording layer L2 of the second optical disc D2. The objective lens 12 is designed such that a spherical aberration is corrected at this time.

The objective lens 12 formed with the annular diffraction grating 12a focuses the incident first laser beam by a diffraction effect onto the signal recording layer L1 of the first disc D1. A numerical aperture in this case is set so as to be at a value appropriate for the first optical disc D1. The objective lens 12 focuses the incident second laser beam by a diffraction effect onto the signal recording layer L2 of the second optical disc D2. A numerical aperture in this case is set so as to be at a value appropriate for the second optical disc D2.

The first laser beam and the second laser beam which are focused on the signal recording layer L1 included in the first optical disc D1 and on the signal recording layer L2 included in the second optical disc D2 are respectively reflected by the signal recording layers L1 and L2 to become return lights. The resultant return lights enter the objective lens 12 from optical discs D1 and D2 sides. The return lights entering the objective lens 12 pass through the objective lens 12, and thereafter, enter the quarter-wave plate 11.

The return lights entering the quarter-wave plate 11 are converted by the quarter-wave plate 11 from a circular polarized light into a linear polarized light. In this case, while the laser beams to be applied to the optical discs D1 and D2 are a p-polarized light, the return lights are an s-polarized light. The return lights converted by the quarter-wave plate 11 into the s-polarized light are reflected by the reflection mirror 10, and thereafter, enter the collimator lens 9.

The return lights entering the collimator lens 9 pass through the collimator lens 9, and enter the polarization beam splitter 8. The return lights entering the polarization beam splitter 8, which have been converted by the quarter-wave plate 11 into the s-polarized light as described above, are reflected without passing through the polarization filter surface 8a provided with the polarization beam splitter 8.

Reference numeral 13 denotes a servo lens disposed at a position where the return lights reflected by the polarization filter surface 8a provided with the polarization beam splitter 8 enter. With the servo lens 13, the return lights is applied to the photodetector 14 to generate a focus error component of the laser beams to be applied to the signal recording layers L1 and L2 included in the optical discs D1 and D2.

Figure 3:
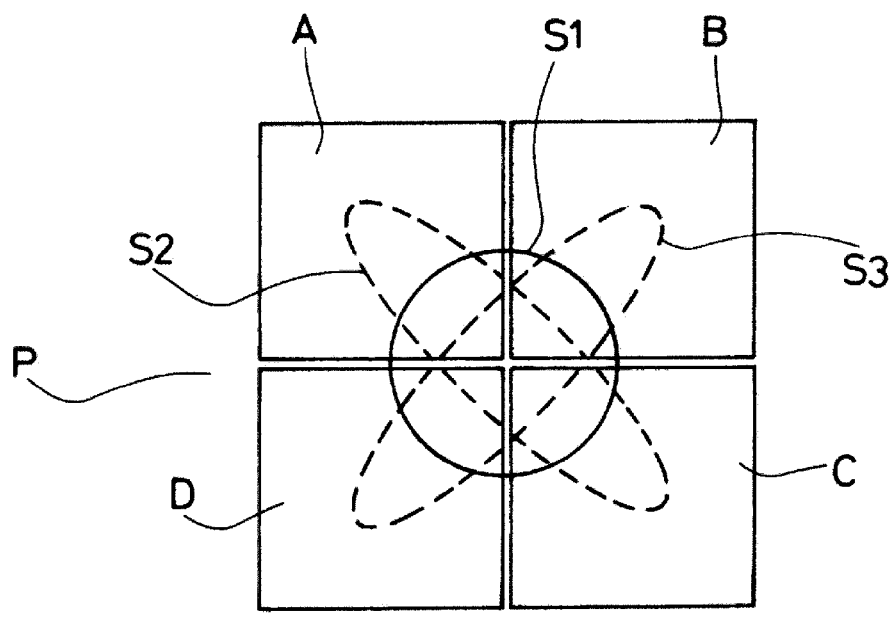
FIG. 3 is a schematic diagram showing one example of a light receiving portion of a photodetector.

Herein, a configuration of the photodetector 14 conventionally and generally used will be described with reference to FIG. 3. FIG. 3 shows a photodetector having a configuration generally called a four-divided sensor. The photodetector 14 includes a square-shaped light receiving portion P having four sensor portions A, B, C, and D, each in a square shape. In such a configuration, when the first laser beam or the second laser beam is precisely focused on the signal recording layer L1 or L2, i.e., when being in focus, a sensor portion of the photodetector 14 is irradiated with a main beam used for a focusing control operation in a circular laser spot shape as represented by a solid line S1. However, when the first laser beam or the second laser beam is not precisely focused on the signal recording layer L1 or L2, i.e., when not in focus, the sensor portion of the photodetector 14 is irradiated with the main beam in an elliptical laser spot shape as represented by a dotted line S2 or S3.

As is common knowledge, a focusing control operation in the optical pickup apparatus is started with moving the objective lens 12 in a vertical direction relative to the signal surface of the first optical disc D1 or the second optical disc D2, to an operation position where the focusing control operation can be performed. Such an operation for moving the objective lens 12 in an operation position is performed by changing a direct current voltage value of a drive signal supplied to a focus coil.

That is, when continuously changing the direct current voltage value of the drive signal supplied to the focus coil, the objective lens 12 is moved from a position distant from the signal surface of the first optical disc D1 or the second optical disc D2 to a position close thereto or from the position close thereto to the position distant therefrom. When the objective lens 12 is moved relative to the optical discs D1 and D2 as described above, a spot formed by irradiating a sensor portion making up a light receiving portion P included in the photodetector 14 with the main beam changes in shape, along with a moving operation of the objective lens 12, as in order of S2, S1 and S3; or S3, S1, and S2.

Figure 4:
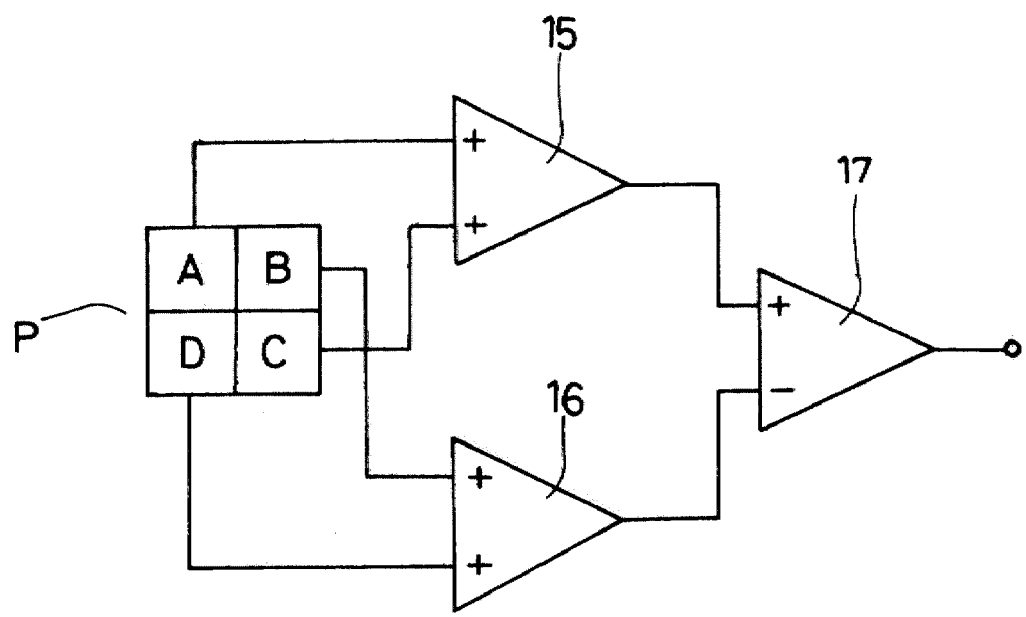
FIG. 4 is a diagram showing one example of a circuit for generating a focus error signal.

A generation operation of the focus error signal is described with reference to FIG. 4. In FIG. 4, reference numeral 15 denotes a first adding circuit for adding a signal obtained from a sensor portion A and a sensor portion C of the light receiving portion P making up the photodetector 14; reference numeral 16 denotes a second adding circuit for adding a signal obtained from a sensor portion B and a sensor portion D of the light receiving portion P making up the photodetector 14; and reference numeral 17 denotes a subtracting circuit for subtracting output of the second adding circuit 16 from that of the first adding circuit 15. An output signal of the subtracting circuit 17 is the focus error signal.

That is, a focus error signal FE can be obtained by an expression FE=(A+C)−(B+D), and thus, by a circuit shown in FIG. 4, the focus error signal can be generated.

Figure 5:
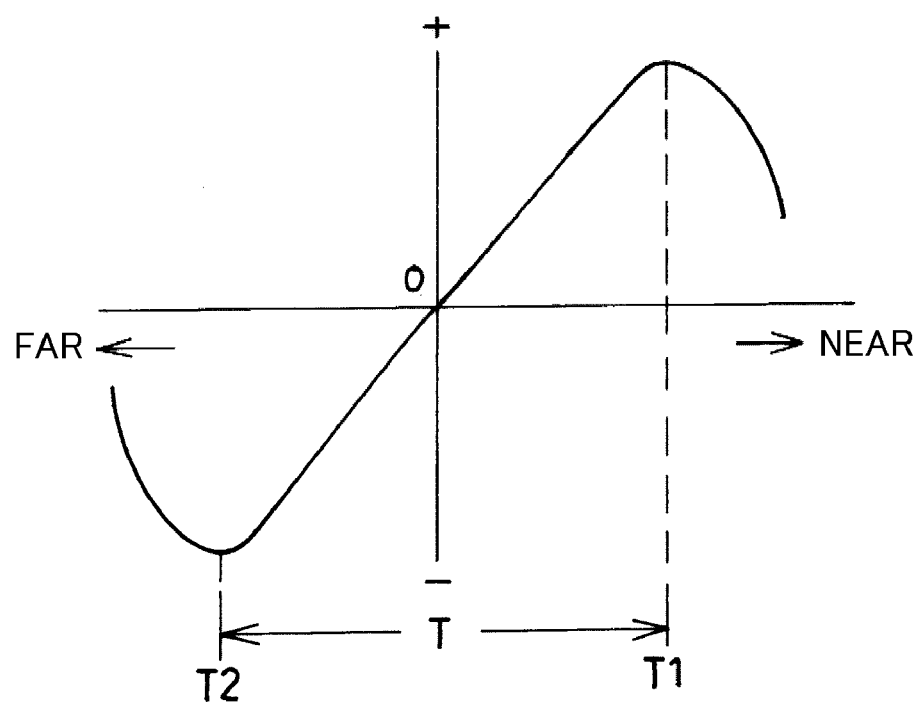
FIG. 5 is a characteristic graph showing a level change of the focus error signal relative to a distance between an optical disc and an objective lens.

FIG. 5 shows a level change of the focus error signal FE obtained when the objective lens 12 is moved in a vertical direction relative to the signal surface of the optical discs D1 and D2. In FIG. 5, a horizontal axis represents a distance from the optical discs D1 and D2 to the objective lens 12, a vertical axis represents a level of the focus error signal FE.

As is obvious from a characteristic in FIG. 5, when a distance from the optical discs D1 and D2 to the objective lens 12 is T1, the level of the focus error signal FE becomes maximum. When the distance from the optical discs D1 and D2 to the objective lens 12 is T2, the level of the focus error signal FE becomes minimum. The objective lens 12 is to be moved between a position of the distance T1 and a position of the distance T2, i.e., to be moved within a range of a distance T. Within this, range, there is a position at which the focus error signal FE becomes zero.

When the objective lens 12 is positioned at a place where the focus error signal FE becomes zero, the first laser beam or the second laser beam is in a state of being focused on the signal recording layer L1 or L2 included in the optical disc D1 or D2, i.e., a focused state. Therefore, by controlling the position of the objective lens 12 so that the level of the focus error signal FE becomes zero, the focusing control operation is performed.

Such a focusing control operation is performed by supplying the focus coil with the drive signal for moving the objective lens so that the level of the focus error signal FE becomes zero with utilizing the focus error signal FE generated based on the signal obtained from the photodetector 14. However, such an operation is well known, thereby omitting the description thereof.

The generation operation of the focus error signal FE is performed as above. There will be described a relationship between: the focus error signal FE; and the spot formed by applying the return light to the light receiving portion P included in the photodetector 14.

As described above, when the objective lens 12 is moved in the vertical direction relative to the signal surface of the optical discs D1 and D2, the spot formed by irradiating the sensor portion making up the light receiving portion P with the return light changes in shape as in order of S2, S1, and S3 or from S3, S1, and S2.

As shown in FIG. 5, when the distance from the signal recording layers L1 and L2 of the optical discs D1 and D2 to the objective lens 12 is T1, the level of the focus error signal FE becomes maximum. A spot shape at this time is an elliptical spot, as S2, of which the longer diameter extends in directions of sensor portion A and sensor portion C. When the distance from the optical discs D1 and D2 to the objective lens 12 is T2, the level of the focus error signal FE becomes minimum. A spot shape at this time is an elliptical spot, as S3, of which the longer diameter extends in directions of sensor portion B and sensor portion D. In a state where the focus error signal FE is zero, i.e., in a focused state, the spot shape is a circular spot as S1.

As described above, when the distance from the signal recording layers L1 and L2 of the optical discs D1 and D2 to the objective lens 12 is changed from T1 to T2, the shape of the spot formed in the sensor portion making up the light receiving portion P is changed from S2 to S1 and from S1 to S3, and during this time, the level of the focus error signal FE changes from the maximum to the minimum.

In such a configuration, when the numerical aperture of the objective lens is reduced to the advantage of an optical axis deviation so that the first laser beam of a first wavelength, which is a longer wavelength, is focused onto the signal recording layer L1 of the first optical disc D1, the flare light is increased as described above. When the flare light is increased, the flare light is applied to not a central part of the sensor portions A, B, C, and D making up the light receiving portion P, but a wider light receiving region.

In this way, the flare light applied to the sensor portions A, B, C, and D is applied to not only the portions where the spots S1, S2 and S3 are formed through irradiation but also other portions, i.e., remaining portions.

When the flare light is thus increased, the flare light is applied to the wider region of the sensor portions A, B, C, and D making up the light receiving portion P of the photodetector 14. However, the flare light applied to each of the sensor portions A, B, C, and D is not even, and thus, a signal output obtained according to an amount of received flare light differs greatly among the sensor portions.

When there is a great difference in the signal output obtained from each sensor portion, since the focus error signal is obtained by the expression FE=(A+C)−(B+D), as described above, it becomes difficult to obtain an exact focus error signal. As a result, the focus servo operation can not be performed precisely, thereby causing a problem that the first laser beam and the second laser beam can not be precisely focused on the signal recording layers L1 and L2 included in the optical discs D1 and D2.

Figure 2:
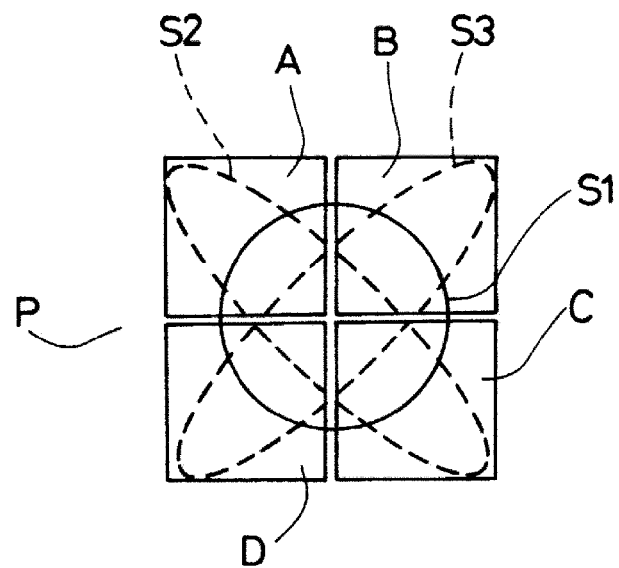
FIG. 2 is a schematic diagram showing one example of a light receiving portion of a photodetector used in the optical pickup apparatus according to one embodiment of the present invention.

In order to improve this point, in the present invention, sizes of the four sensor portions A, B, C, and D making up the light receiving portion P are devised as shown in FIG. 2. That is, one of the features of the present invention is that: a length of a diagonal line of the light receiving portion P which is in a square shape formed by the four sensor portions A, B, C, and D is made equal to a length of the longer diameter of the elliptical spot when the level of the focus error signal FE becomes maximum.

When the size of the light receiving portion P included in the photodetector 14 is set as described above, the proportion increases of an irradiated area of the laser spots S1, S2, and S3 formed by irradiation of the main beam used for the focusing control operation in the sensor portions A, B, C, and D. Thus, it becomes possible to reduce an influence caused by the flare light. Therefore, even though the flare light increases due to reduction of the numerical aperture for the first laser beam set according to the first optical disc D1 of the objective lens 12, the exact focus error signal may be obtained. Thus, a stable focus servo operation may be performed.

In an embodiment according to the present invention, as described above, since the light receiving portion P included in the photodetector 14 is formed in a square shape as the conventional light receiving portion is, it is possible to manufacture the photodetector more easily and at a lower cost as compared to a photodetector in a special shape.

In an embodiment according to the present invention, a configuration is made such that the length in a diagonal line direction of the square light receiving portion P is equal to that of the longer diameter of the elliptical spot to eliminate the influence caused by the flare light. However, masking means such as a liquid crystal control element can be disposed in an optical path of the return light, for example between the servo lens 13 and the photodetector 14, and the liquid crystal control element is controlled to regulate an irradiation range of the return light applying the light receiving portion.

Such a liquid crystal control element is provided with a liquid crystal panel formed with a pattern for setting a range in which light is transmitted, and is configured to change a state of a liquid crystal by applying a drive control voltage to a control electrode included in the liquid crystal panel. Such a liquid crystal control element is well known, thereby omitting the description thereof.

The photodetector 14 of an embodiment according to the present invention is configured as above. Next, a description is given of the spot formed by irradiating the light receiving portion P included in the photodetector 14 with the return light with reference to a characteristic graph shown in FIG. 6.

Figure 6:
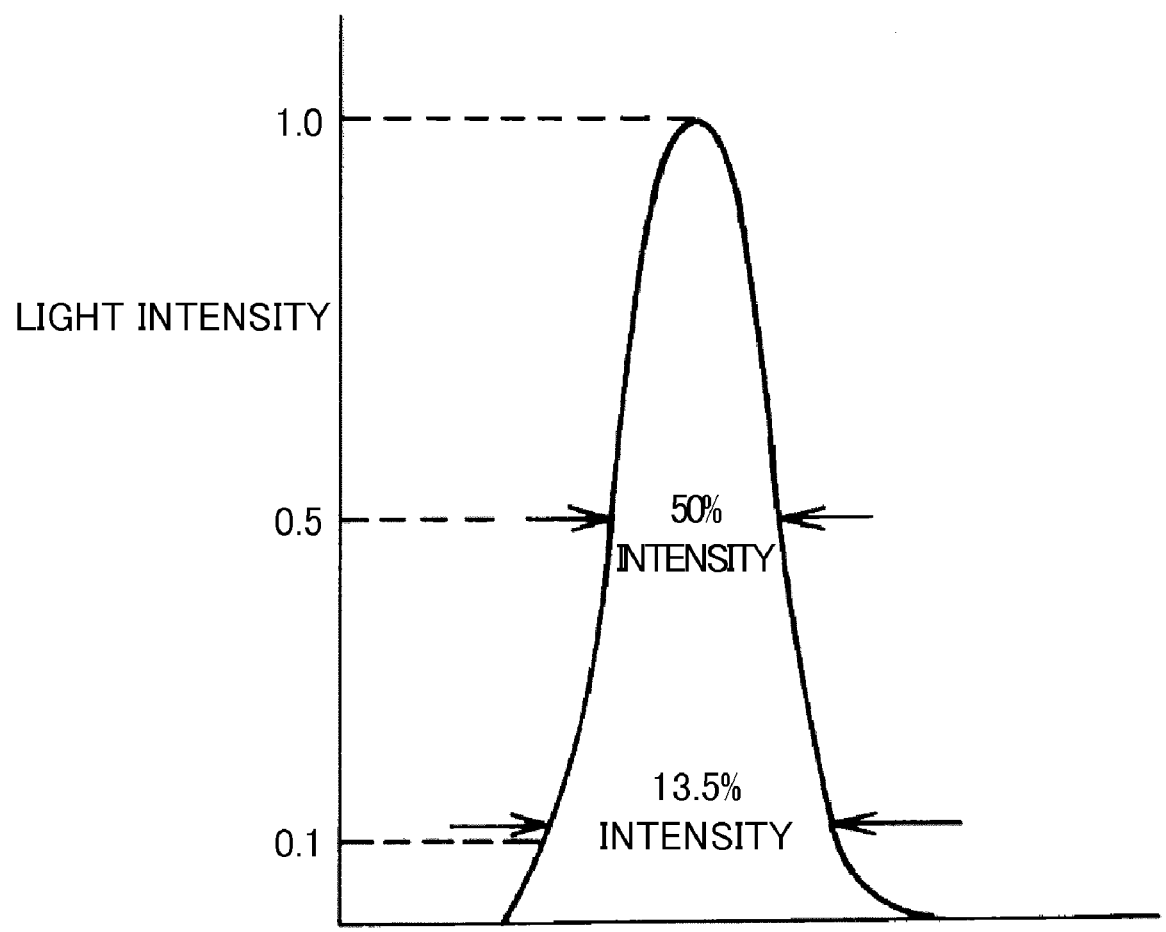
FIG. 6 is a characteristic graph for explaining an intensity distribution of a laser beam according to one embodiment of the present invention.

The laser beam emitted from the laser diode has a characteristic called Gaussian. FIG. 6 shows an intensity distribution characteristic of a laser beam having the Gaussian characteristic. In the optical pickup apparatus, there are set a numerical aperture of lenses used for an optical system such as the objective lens 12 and the servo lens 13; a laser intensity required for performing a reproducing operation of a signal recorded in the optical disc; and a diameter of a spot for obtaining a laser beam required for recording a signal onto the optical disc.

The diameter of the spot to be used is set to a range in which required laser intensity can be obtained in a characteristic graph shown in FIG. 6. For example, in FIG. 6, when the maximum intensity of the laser beam is 1.0, the spot diameter is set so as to use a portion of the laser beam, as a spot, whose intensity is higher than that at a position of 50%-intensity that is called a so-called half-width, where the intensity is 0.5, i.e., half relative to the maximum intensity; and to use a portion of the laser beam, as a spot, whose intensity is higher than that at a position of 13.5%-intensity, where the intensity is 0.135, i.e., $1/e^2$ (e is the base of a natural logarithm) relative to the maximum intensity.

As described above, the spot diameter is set based on the laser intensity distribution. The intensity range of the laser beam used as the spot is determined depending on which value among a size of the spot; a peak light intensity of the spot; and all the power of the spot, is prioritized.

In the present optical pickup apparatus, the spot diameter set based on the intensity distribution of the laser beam is set: in consideration of a power loss of the laser beam; and generally so as to use a portion of the laser beam, as a spot, whose intensity higher than that at a position of a 13.5%, where the intensity is $1/e^2$ relative to the maximum intensity. When the spot diameter is thus set, it becomes possible to obtain a spot diameter with which a reproducing characteristic or a recording characteristic of a great number of optical pickup apparatuses can be satisfied.

Since the spot diameter is set as described above, when the length of the light receiving portion making up the photodetector is set so as to match the intensity range of the laser beam which determines the spot diameter, it becomes possible to set the size of the light receiving portion used for generating the focus error signal to a minimum size, and as a result, an adverse effect caused by the flare can be reduced to a maximum.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
   an objective lens formed with an annular diffraction grating according to a numerical aperture so that a first laser beam having a first wavelength and a second laser beam having a second wavelength are focused onto a signal recording layer of a first optical disc and a signal recording layer of a second optical disc respectively, the first and second optical discs respectively including cover layers different in thickness covering the signal recording layers;
   a first diffraction grating configured to split the first laser beam and a second diffraction grating configured to split the second laser beam into zeroth-order diffracted light and ±first-order diffracted light; and
   a photodetector including a square-shaped light receiving portion for being irradiated with return light as a spot, wherein:
      the light receiving portion includes a four-divided light receiving portion having four sensor portions each in a square shape,
      the return light is return light of the zeroth-order light of the first laser beam reflected from the signal recording layer of the first optical disc or return light of the zeroth-order light of the second laser beam reflected from the signal recording layer of the second optical disc,
      a focus error signal is generated from the return light of the zeroth-order light of a laser beam having the shorter wavelength of the first wavelength and the second wavelength, wherein the laser beam having the shorter wavelength is focused on the respective optical disc, and
      a length of a diagonal line of the light receiving portion is substantially equal to a length of a diameter of an elliptical spot formed in a direction of the diagonal line when the focus error signal is at a maximum level.

2. The optical pickup apparatus according to claim 1, wherein
the focus error signal is generated based on the spot of a portion in which an intensity of the laser beam is equal to or greater than a predetermined value.

3. The optical pickup apparatus according to claim 2, wherein
the predetermined value includes a value obtained by multiplying a maximum intensity of the laser beam by $1/e^2$, the e being a base of a natural logarithm.

* * * * *

UNITED STATES PATENT AND TRADEMARK OFFICE
CERTIFICATE OF CORRECTION

PATENT NO. : 8,305,868 B2
APPLICATION NO. : 12/137312
DATED : November 6, 2012
INVENTOR(S) : Tohru Hotta et al.

It is certified that error appears in the above-identified patent and that said Letters Patent is hereby corrected as shown below:

Claim 3, Column 12, Line 4, delete "1/e2," and insert --$1/e^2$,--, therefor.

Signed and Sealed this
First Day of January, 2013

David J. Kappos
*Director of the United States Patent and Trademark Office*